(12) United States Patent
Danait et al.

(10) Patent No.: US 11,824,719 B2
(45) Date of Patent: *Nov. 21, 2023

(54) DISCOVERING AND GROUPING APPLICATION ENDPOINTS IN A NETWORK ENVIRONMENT

(71) Applicant: Cisco Technology, Inc., San Jose, CA (US)

(72) Inventors: Sachin Waman Danait, Plano, TX (US); Kannan Ponnuswamy, Murphy, TX (US); Paul John Lesiak, West Orange, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,241

(22) Filed: Sep. 28, 2022

(65) Prior Publication Data

US 2023/0020431 A1 Jan. 19, 2023

Related U.S. Application Data

(63) Continuation of application No. 17/026,654, filed on Sep. 21, 2020, now Pat. No. 11,539,588, which is a
(Continued)

(51) Int. Cl.
*H04L 41/0853* (2022.01)
*H04L 41/142* (2022.01)
*H04L 41/0893* (2022.01)

(52) U.S. Cl.
CPC ...... *H04L 41/0853* (2013.01); *H04L 41/0893* (2013.01); *H04L 41/142* (2013.01)

(58) Field of Classification Search
CPC . H04L 41/0853; H04L 41/142; H04L 41/122; H04L 41/0893
See application file for complete search history.

(56) References Cited

U.S. PATENT DOCUMENTS

| | | |
|---|---|---|
| 5,204,829 A | 4/1993 | Lyu et al. |
| 6,539,483 B1 | 3/2003 | Harrison et al. |

(Continued)

FOREIGN PATENT DOCUMENTS

| | | |
|---|---|---|
| CN | 105471830 | 4/2016 |
| CN | 105721193 | 6/2016 |

(Continued)

OTHER PUBLICATIONS

"Cisco Application Centric Infrastructure 9ACI) Endpoint Groups (EPG) Usage and Design," White Paper, Cisco Systems, Inc., May 2014, pp. 1-14.

(Continued)

*Primary Examiner* — Abdullahi E Salad
(74) *Attorney, Agent, or Firm* — Polsinelli

(57) ABSTRACT

An example method for discovering and grouping application endpoints in a network environment is provided and includes discovering endpoints communicating in a network environment, calculating affinity between the discovered endpoints, and grouping the endpoints into separate endpoint groups (EPGs) according to the calculated affinity, each EPG comprising a logical grouping of similar endpoints for applying common forwarding and policy logic according to logical application boundaries. In specific embodiments, the affinity includes a weighted average of network affinity, compute affinity and user specified affinity.

20 Claims, 7 Drawing Sheets

Related U.S. Application Data continuation of application No. 15/686,445, filed on Aug. 25, 2017, now Pat. No. 10,797,951, which is a continuation of application No. 14/516,354, filed on Oct. 16, 2014, now Pat. No. 9,781,004.

(56) References Cited

U.S. PATENT DOCUMENTS

| | | |
|---|---|---|
| 6,763,380 B1 | 7/2004 | Mayton et al. |
| 7,003,562 B2 | 2/2006 | Mayer |
| 7,089,369 B2 | 8/2006 | Emberling |
| 7,127,686 B2 | 10/2006 | Dreschler et al. |
| 7,360,064 B1 | 4/2008 | Steiss et al. |
| 7,453,886 B1 | 11/2008 | Allan |
| 7,505,463 B2 | 3/2009 | Schuba et al. |
| 7,548,967 B2 | 6/2009 | Amyot et al. |
| 7,552,201 B2 | 6/2009 | Areddu et al. |
| 7,609,647 B2 | 10/2009 | Turk et al. |
| 7,619,989 B2 | 11/2009 | Guingo et al. |
| 7,698,561 B2 | 4/2010 | Nagendra et al. |
| 7,743,274 B2 | 6/2010 | Langford et al. |
| 7,765,093 B2 | 7/2010 | Li et al. |
| 8,010,952 B2 | 8/2011 | Datla et al. |
| 8,073,935 B2 | 12/2011 | Viswanath |
| 8,103,480 B2 | 1/2012 | Korn et al. |
| 8,190,719 B2 | 5/2012 | Furukawa |
| 8,209,738 B2 | 6/2012 | Nicol et al. |
| 8,261,116 B2 * | 9/2012 | Palmer ............... H04L 67/1008 718/1 |
| 8,261,339 B2 | 9/2012 | Aldridge et al. |
| 8,312,261 B2 | 11/2012 | Rao et al. |
| 8,375,117 B2 | 2/2013 | Venable, Sr. |
| 8,441,941 B2 | 5/2013 | McDade et al. |
| 8,479,267 B2 | 7/2013 | Donley et al. |
| 8,484,693 B2 | 7/2013 | Cox et al. |
| 8,494,977 B1 | 7/2013 | Yehuda et al. |
| 8,554,883 B2 | 10/2013 | Sankaran |
| 8,589,934 B2 | 11/2013 | Makljenovic et al. |
| 8,621,284 B2 | 12/2013 | Kato |
| 8,627,328 B2 | 1/2014 | Mousseau et al. |
| 8,693,344 B1 | 4/2014 | Adams et al. |
| 8,693,374 B1 | 4/2014 | Murphy et al. |
| 8,761,036 B2 | 6/2014 | Fulton et al. |
| 8,782,182 B2 | 7/2014 | Chaturvedi et al. |
| 8,824,482 B2 | 9/2014 | Kajekar et al. |
| 8,874,705 B1 | 10/2014 | Satish |
| 8,910,143 B2 | 12/2014 | Cohen et al. |
| 8,914,843 B2 | 12/2014 | Bryan et al. |
| 8,924,798 B2 | 12/2014 | Jerde et al. |
| 9,019,840 B2 | 4/2015 | Salam et al. |
| 9,038,151 B1 | 5/2015 | Chua et al. |
| 9,055,000 B1 | 5/2015 | Ghosh et al. |
| 9,106,555 B2 | 6/2015 | Agarwal et al. |
| 9,137,096 B1 | 9/2015 | Yehuda et al. |
| 9,225,601 B2 | 12/2015 | Khurshid et al. |
| 9,246,818 B2 | 1/2016 | Deshpande et al. |
| 9,264,922 B2 | 2/2016 | Gillot et al. |
| 9,276,877 B1 | 3/2016 | Chua et al. |
| 9,319,300 B2 | 4/2016 | Huynh Van et al. |
| 9,344,348 B2 | 5/2016 | Ivanov et al. |
| 9,369,434 B2 | 6/2016 | Kim et al. |
| 9,389,993 B1 | 7/2016 | Okmyanskiy et al. |
| 9,397,946 B1 * | 7/2016 | Yadav ............... H04L 45/7453 |
| 9,405,553 B2 | 8/2016 | Branson et al. |
| 9,444,842 B2 | 9/2016 | Porras et al. |
| 9,497,207 B2 | 11/2016 | Dhawan et al. |
| 9,497,215 B2 | 11/2016 | Vasseur et al. |
| 9,544,224 B2 | 1/2017 | Chu et al. |
| 9,548,965 B2 | 1/2017 | Wang et al. |
| 9,553,845 B1 | 1/2017 | Talmor et al. |
| 9,571,502 B2 | 2/2017 | Basso et al. |
| 9,571,523 B2 | 2/2017 | Porras et al. |
| 9,594,640 B1 | 3/2017 | Chheda |
| 9,596,141 B2 | 3/2017 | McDowall |
| 9,641,249 B2 | 5/2017 | Kaneriya et al. |
| 9,654,300 B2 | 5/2017 | Pani |
| 9,654,361 B2 | 5/2017 | Vasseur et al. |
| 9,654,409 B2 | 5/2017 | Yadav et al. |
| 9,660,886 B1 | 5/2017 | Ye et al. |
| 9,660,897 B1 | 5/2017 | Gredler |
| 9,667,645 B1 | 5/2017 | Belani et al. |
| 9,680,875 B2 | 6/2017 | Knjazihhin et al. |
| 9,686,180 B2 | 6/2017 | Chu et al. |
| 9,686,296 B1 | 6/2017 | Murchison et al. |
| 9,690,644 B2 | 6/2017 | Anderson et al. |
| 9,781,004 B2 | 10/2017 | Danait et al. |
| 9,787,559 B1 | 10/2017 | Schroeder |
| 9,998,247 B1 | 6/2018 | Choudhury et al. |
| 10,084,795 B2 | 9/2018 | Akireddy et al. |
| 10,084,833 B2 | 9/2018 | McDonnell et al. |
| 10,084,895 B2 | 9/2018 | Kasat et al. |
| 2002/0143855 A1 * | 10/2002 | Traversat ............... H04L 67/107 709/213 |
| 2002/0178246 A1 | 11/2002 | Mayer |
| 2003/0229693 A1 | 12/2003 | Mahlik et al. |
| 2004/0073647 A1 | 4/2004 | Gentile et al. |
| 2004/0168100 A1 | 8/2004 | Thottan et al. |
| 2005/0108389 A1 | 5/2005 | Kempin et al. |
| 2007/0011629 A1 | 1/2007 | Shacham et al. |
| 2007/0124437 A1 | 5/2007 | Chervets |
| 2007/0214244 A1 | 9/2007 | Hitokoto et al. |
| 2008/0031147 A1 | 2/2008 | Fieremans et al. |
| 2008/0117827 A1 | 5/2008 | Matsumoto et al. |
| 2008/0133731 A1 * | 6/2008 | Bradley ............... H04L 67/1061 709/223 |
| 2008/0172716 A1 | 7/2008 | Talpade et al. |
| 2008/0320438 A1 * | 12/2008 | Funto ............... G06F 8/33 717/106 |
| 2009/0240758 A1 * | 9/2009 | Pasko ............... H04L 67/101 709/201 |
| 2009/0249284 A1 | 10/2009 | Antosz et al. |
| 2010/0191612 A1 | 7/2010 | Raleigh |
| 2010/0198909 A1 | 8/2010 | Kosbab et al. |
| 2011/0093612 A1 | 4/2011 | Murakami |
| 2011/0295983 A1 | 12/2011 | Medved et al. |
| 2012/0054163 A1 | 3/2012 | Iu et al. |
| 2012/0198073 A1 | 8/2012 | Srikanth et al. |
| 2012/0297061 A1 | 11/2012 | Pedigo et al. |
| 2013/0097660 A1 | 4/2013 | Das et al. |
| 2013/0191516 A1 | 7/2013 | Sears |
| 2013/0290238 A1 | 10/2013 | Griffith et al. |
| 2014/0019597 A1 | 1/2014 | Nath et al. |
| 2014/0177638 A1 | 6/2014 | Bragg et al. |
| 2014/0222996 A1 | 8/2014 | Vassuer et al. |
| 2014/0304831 A1 * | 10/2014 | Hidlreth ............... G06F 21/6218 726/27 |
| 2014/0307556 A1 | 10/2014 | Zhang |
| 2014/0321277 A1 | 10/2014 | Lynn, Jr. et al. |
| 2014/0379915 A1 | 12/2014 | Yang et al. |
| 2015/0019756 A1 | 1/2015 | Masuda |
| 2015/0113143 A1 | 4/2015 | Stuart et al. |
| 2015/0124826 A1 | 5/2015 | Edsall et al. |
| 2015/0186206 A1 | 7/2015 | Battacharya et al. |
| 2015/0234695 A1 | 8/2015 | Cuthbert et al. |
| 2015/0244617 A1 | 8/2015 | Nakil et al. |
| 2015/0271104 A1 | 9/2015 | Chikkamath et al. |
| 2015/0295771 A1 | 10/2015 | Cuni et al. |
| 2015/0365314 A1 | 12/2015 | Hiscock et al. |
| 2015/0381484 A1 | 12/2015 | Hira et al. |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1 | 2/2016 | Erickson et al. |
| 2016/0048420 A1 | 2/2016 | Gourlay et al. |
| 2016/0078220 A1 | 3/2016 | Scharf et al. |
| 2016/0080350 A1 | 3/2016 | Chaturvedi et al. |
| 2016/0099883 A1 | 4/2016 | Voit et al. |
| 2016/0105317 A1 | 4/2016 | Zimmermann et al. |
| 2016/0112246 A1 | 4/2016 | Singh et al. |
| 2016/0112269 A1 | 4/2016 | Singh et al. |
| 2016/0149751 A1 | 5/2016 | Pani et al. |
| 2016/0164748 A1 | 6/2016 | Kim |
| 2016/0224277 A1 | 8/2016 | Batra et al. |
| 2016/0241436 A1 | 8/2016 | Fourie et al. |

(56) References Cited

U.S. PATENT DOCUMENTS

| | | |
|---|---|---|
| 2016/0254964 A1 | 9/2016 | Benc |
| 2016/0267384 A1 | 9/2016 | Salam et al. |
| 2016/0323319 A1 | 11/2016 | Gourlay et al. |
| 2016/0330076 A1 | 11/2016 | Tiwari et al. |
| 2016/0352566 A1 | 12/2016 | Mekkattuparamnhan et al. |
| 2016/0359697 A1 | 12/2016 | Scheib et al. |
| 2016/0380892 A1 | 12/2016 | Mahadevan et al. |
| 2017/0026292 A1 | 1/2017 | Smith et al. |
| 2017/0031800 A1 | 2/2017 | Shani et al. |
| 2017/0031970 A1 | 2/2017 | Burk |
| 2017/0048110 A1 | 2/2017 | Wu et al. |
| 2017/0048126 A1 | 2/2017 | Handige Shankar et al. |
| 2017/0054758 A1 | 2/2017 | Maino et al. |
| 2017/0063599 A1 | 3/2017 | Wu et al. |
| 2017/0093630 A1 | 3/2017 | Foulkes |
| 2017/0093664 A1 | 3/2017 | Lynam et al. |
| 2017/0093750 A1 | 3/2017 | McBride et al. |
| 2017/0093918 A1 | 3/2017 | Banerjee et al. |
| 2017/0111259 A1 | 4/2017 | Wen et al. |
| 2017/0118167 A1 | 4/2017 | Subramanya et al. |
| 2017/0126740 A1 | 5/2017 | Bejarano et al. |
| 2017/0126792 A1 | 5/2017 | Halpern et al. |
| 2017/0134233 A1 | 5/2017 | Dong et al. |
| 2017/0163442 A1 | 6/2017 | Shen et al. |
| 2017/0187577 A1 | 6/2017 | Nevrekar et al. |
| 2017/0195187 A1 | 7/2017 | Bennett et al. |
| 2017/0206129 A1 | 7/2017 | Yankilevich et al. |
| 2017/0222873 A1 | 8/2017 | Lee et al. |
| 2017/0353355 A1 | 12/2017 | Danait et al. |
| 2018/0069754 A1 | 3/2018 | Dasi et al. |
| 2018/0167294 A1 | 6/2018 | Gupta et al. |
| 2018/0309629 A1 | 10/2018 | Mohanram et al. |
| 2018/0367412 A1 | 12/2018 | Sethi et al. |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | 2015014177 | 2/2015 |
| WO | 2015187337 | 12/2015 |
| WO | 2016011888 | 1/2016 |
| WO | 2016039730 | 3/2016 |
| WO | 3026072996 | 5/2016 |
| WO | 2016085516 | 6/2016 |
| WO | 2016093861 | 6/2016 |
| WO | 2016119436 | 8/2016 |
| WO | 2016130108 | 8/2016 |
| WO | 2016161127 | 10/2016 |
| WO | 2017031922 | 3/2017 |
| WO | 2017039606 | 3/2017 |
| WO | 2017105452 | 6/2017 |

OTHER PUBLICATIONS

Akella, Aditya, et al., "A Highly Available Software Defined Fabric," HotNets-XIII, Oct. 27-28, 2014, Los Angeles, CA, USA, Copyright 2014, ACM, pp. 1-7.

Alsheikh, Mohammad Abu, et al., "Machine Learning in Wireless Sensor Networks: Algorithms, Strategies, and Application," Mar. 19, 2015, pp. 1-23.

Author Unknown, "Aids to Pro-active Management of Distributed Resources through Dynamic Fault-Localization and Availability Prognosis," FaultLocalization-TR01-CADlab, May 2006, pp. 1-9.

Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.

Cisco Systems, Inc., "The Cisco Application Policy Infrastructure Controller Introduction: What is the Cisco Application Policy Infrastructure Controller?" Jul. 31, 2014, 19 pages.

Cisco, "Verify Contracts and Rules in the ACI Fabric," Cisco, Updated Aug. 19, 2016, Document ID: 119023, pp. 1-20.

De Silva et al., "Network-wide Security Analysis," Semantic Scholar, Oct. 25, 2011, pp. 1-11.

Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.

Fayaz, Seyed K., et al., "Efficient Network Reachability Analysis using a Succinct Control Plane Representation," 2016, ratul.org, pp. 1-16.

Feldmann, Anja, et al., "IP Network Configuration for Intradomain Traffic Engineering," Semantic Scholar, accessed on Jul. 20, 2017, pp. 1-27.

Han, Wonkyu, et al., "LPM: Layered Policy Management for Software-Defined Networks," Mar. 8, 2016, pp. 1-8.

Han, Yoonseon, et al., "An Intent-based Network Virtualization Platform for SDN," 2016 | FIP, pp. 1-6.

Jain, Praveen, et al., "In-Line Distributed and Stateful Security Policies for Applications in a Network Environment," Cisco Systems, Inc., Aug. 16, 2016, 13 pages.

Kazemian, Peyman, et al., "Real Time Network Policy Checking using Header Space Analysis," USENIX Association, 10th USENIX Symposium on Networked Systems Design and Implementation 2013 (NSDI '13) pp. 99-111.

Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.

Le, Franck, et al., "Minerals: Using Data Mining to Detect Router Misconfigurations," CyLab, Carnegie Mellon University, CMU-CyLab-06-008, May 23, 2006, pp. 1-14.

Liang, Chieh-Jan Mike, et al., "SIFT: Building an Internet of Safe Things," Microsoft, IPSN' 15, Apr. 14-16, 2015, Seattle, WA, ACM 978, pp. 1-12.

Lindem, A., et al., "Network Device YANG Organizational Model draft-rtgyangdt-rtgwg-device-model-01," Network Working Group, Internet-draft, Sep. 21, 2015, pp. 1-33.

Liu, Jason, et al., "A Real-Time Network Simulation Infrastructure Based on Open VPN," Journal of Systems and Software, Aug. 4, 2008, pp. 1-45.

Lopes, Nuno P., et al., "Automatically verifying reachability and well-formedness in P4 Networks," Microsoft, accessed on Jul. 18, 2017, pp. 1-13.

Mai, Haohui, et al., "Debugging the Data Plane with Anteater," SIGCOMM11, Aug. 15-19, 2011, pp. 1-12.

Maldonado-Lopez, Ferney, et al., "Detection and prevention of firewall-rule conflicts on software-defined networking," 2015 7th International Workshop on Reliable Networks Design and Modeling (RNDM), IEEE, Oct. 5, 2015, pp. 259-265.

Miller, Nancy, et al., "Collecting Network Status Information for Network-Aware Applications," INFOCOM 2000, pp. 1-10.

Miranda, Joao Sales Henriques, "Fault Isolation in Software Defined Networks," www.gsd.inescid.pt, 2016, pp. 1-10.

Moon, Daekyeong, et al., "Bridging the Software/Hardware Forwarding Divide," Berkeley.edu, Dec. 18, 2010, pp. 1-15.

Panda, Aurojit, et al., "SCL: Simplifying Distributed SDN Control Planes," people.eecs.berkeley.edu, Mar. 2017, pp. 1-17.

Shin, Seugwon, et al., "FRESCO: Modular Composable Security Services for Software-Defined Networks," To appear in the ISOC Network and Distributed System Security Symposium, Feb. 2013, pp. 1-16.

Shukla, Apoorv, et al., "Towards meticulous data plane monitoring," kaust.edu.sa, accessed on Aug. 1, 2017, pp. 1-2.

Tang, Yongning, et al., "Automatic belief network modeling via policy inference for SDN fault localization," Journal of Internet Services and Applications, 2016, pp. 1-13.

Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.

Tongaonkar, Alok, et al., "Inferring Higher Level Policies from Firewall Rules," Proceedings of the 21st Large Installation System Administration Conference (LISA '07), Nov. 11-16, 2007, pp. 1-14.

(56) References Cited

OTHER PUBLICATIONS

Vega, Andres, et al., "Troubleshooting Cisco Application Centric Infrastructure: Analytical problem solving applied to the Policy Driven Data Center," Feb. 15, 2016, 84 pages.

Kia, Wenfeng, et al., "A Survey on Software-Defined Networking," IEEE Communications Surveys and Tutorials, Mar. 16, 2015, pp. 27-51.

Yu et al., "A Flexible Framework for Wireless-Based Intelligent Sensor with Reconfigurability, Dynamic adding, and Web interface," Conference Paper, Jul. 24, 2006, IEEE 2006, pp. 1-7.

Zhou, Shijie, et al., "High-Performance Packet Classification on GPU," 2014 IEEE, pp. 1-6.

\* cited by examiner

US 11,824,719 B2

DISCOVERING AND GROUPING APPLICATION ENDPOINTS IN A NETWORK ENVIRONMENT

RELATED APPLICATIONS

This application is a continuation of U.S. Non-Provisional patent application Ser. No. 17/026,654, filed on Sep. 21, 2020, which in turn, is a continuation of U.S. Non-Provisional patent application Ser. No. 15/686,445, filed Aug. 25, 2017, which in turn, is a continuation U.S. Non-Provisional patent application Ser. No. 14/516,354, filed Oct. 16, 2014, the disclosures of which are incorporated herein by reference in their entireties.

TECHNICAL FIELD

This disclosure relates in general to the field of communications and, more particularly, to discovering and grouping application endpoints in a network environment.

BACKGROUND

Industry shifts are redefining Information Technology (IT) at all levels. On-premise IT consumption models are shifting to cloud-based services. IT as a service (IaaS) is supplanted by applications as a service. Separate development and operations are moving toward integrated development and operations (DevOps). Box-centric management models are migrating to application-centric management. Business agility requires application agility, so IT teams need to provision applications in hours instead of months. Resources need to scale up (or down) in minutes, not hours. Traditional approaches take a silo-ed operational view, with no common operational model between the application, network, security, and cloud teams. A common operational model delivers application agility, simplified operations, assured performance, and scale.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for discovering and grouping application endpoints in a network environment is provided and includes discovering (e.g., discerning, ascertaining, learning, determining, identifying, etc.) endpoints communicating in a network environment, calculating affinity between the discovered endpoints, and grouping the endpoints into separate endpoint groups (EPGs) according to the calculated affinity, each EPG comprising a logical grouping of similar endpoints that can be used to apply common forwarding and policy logic according to logical application boundaries.

As used herein, the broad term "affinity" encompasses any type of common property, such as traffic attribute (e.g., source address, destination address, protocol, etc.), process attribute (e.g., process performance, process definition, process deployment, etc.), socket attribute (e.g., type, protocol, domain, etc.), communication pattern, configuration setting, profile, etc. that links two endpoints in the network. An "endpoint" comprises an addressable application component (e.g., portion of an application encapsulating a set of related functions and/or data) that provides or consumes a network service (e.g., data storage, manipulation, presentation, communication or other such function); EPGs act as flexible containers for endpoints on which common policy can be applied. For example, a database tier endpoint can represent a configurable connection point to a database; an application tier endpoint can represent a connection point for services provided by the application tier component. In a general sense, all communication to and from a specific application occurs through the application's endpoints.

EXAMPLE EMBODIMENTS

Figure 1:
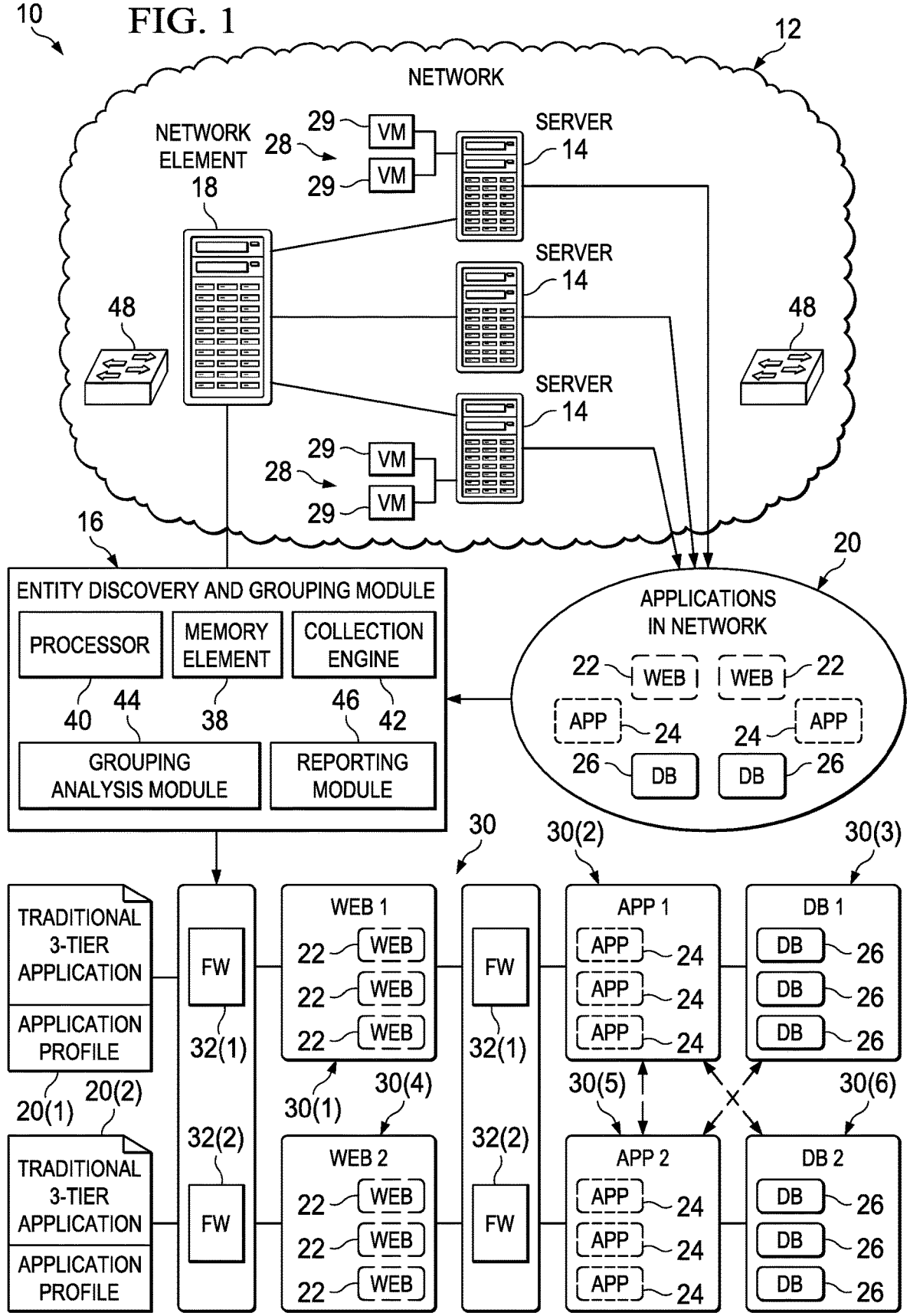
FIG. 1 is a simplified block diagram illustrating a communication system for discovering and grouping application endpoints in a network environment.

Turning to FIG. 1, FIG. 1 is a simplified block diagram illustrating a communication system 10 for discovering and grouping application endpoints in a network environment in accordance with one example embodiment. FIG. 1 illustrates a network 12 with one or more servers 14. Each server 14 may be coupled (directly or indirectly) to an entity discovery and grouping module 16 executing on a network element 18 in network 12. As used herein, the term "network element" is meant to encompass switches, computers, network appliances, servers, routers, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Each server 14 may host one or more applications 20 that can comprise various application components, for example, web tier components 22, application tier components 24 and database tier components 26. By way of example, and not as limitation, the application components may execute as endpoints 28 on servers 14, and/or virtual machines 29. According to various embodiments, entity discovery and grouping module 16 may enable discovery and grouping of endpoints 28 into suitable endpoint groups (EPGs) 30 according to user defined criteria. As used herein, the term "Endpoint Group" refers to a collection of similar endpoints representing application components, such as application tier, set of services, or other logical application boundary. For example, EPGs 30 can comprise collections of one or more endpoints 28 that provide similar functionalities. Note that endpoints can be identified (e.g., for purposes of grouping) by virtual port, physical port, Internet Protocol (IP) address, Domain Name System (DNS) name, IP address plus Layer 4 port, and other suitable unique identifiers.

EPGs 30 can provide logical groupings that can be used to apply forwarding and policy logic (e.g., rules, strategies, plans, configurations, etc.), potentially allowing for separating network policy, security, and forwarding from addressing and enforcing them on logical application boundaries. Within a particular EPG, separate endpoints can exist in one or more subnets, and subnets can be applied to one or more EPGs. For example, a particular EPG can include HTTPS endpoints and HTTP endpoints; HTTPS endpoints may reside in 10.10.11.x subnet and HTTP endpoints may reside in 10.10.10.x subnet. Regardless of the separate subnets, a common policy can be applied to both HTTPS and HTTP services within the EPG. In a general sense, EPGs 30 allow for better mapping of applications to network 12, and for better mapping of network 12 to application owners and developers. For example, rather than application owners and developers being required to maintain mappings to IP addressing and subnets, they can group application components into logical EPGs according to the embodiments described herein.

EPGs 30 can be used to group endpoints 28 according to any suitable criteria. For example, EPGs 30 can be specified according to traditional network VLANs: all endpoints connected to a given VLAN are placed in a particular EPG; EPGs 30 can be specified according to Virtual Extensible LAN (VXLAN): all endpoints connected to a given VXLAN are placed in a particular EPG; EPGs 30 can be mapped to a port group; EPGs 30 can be specified by IP or subnet (e.g., 172.168.10.10 or 172.168.10 may be grouped into one EPG); EPGs 30 can be specified by DNS names or DNS ranges: for instance, example.foo.com or *.web.foo.com can be mapped to a specific EPG; and so on.

By way of examples and not as limitations, certain endpoints 28 representing web tier components 22 corresponding to application 20(1) may be grouped into EPG 30(1); certain other endpoints 28 representing application tier components corresponding to application 20(1) may be grouped into EPG 30(2); and certain other endpoints 28 representing database tier components corresponding to application 20(1) may be grouped into EPG 30(3). The combination of EPGs 30(1)-30(3) and forwarding elements (e.g., switches, routers, etc.) 32(1) and connectivity and policies between them may comprise an application profile of application 20(1).

Similarly, certain other endpoints representing web tier components 22 corresponding to application 20(2) may be grouped into EPG 30(4); certain other endpoints representing application tier components corresponding to application 20(2) may be grouped into EPG 30(5); and certain other endpoints representing database tier components corresponding to application 20(2) may be grouped into EPG 30(6). The combination of EPGs 30(4)-30(6) and forwarding elements 32(2) and connectivity and policies between them may comprise an application profile of application 20(2) and so on.

Entity discovery and grouping module 16 may include a memory element 38, a processor 40 (e.g., associated with network element 18), a collection engine 42, a grouping analysis module 44 and a reporting module 46 for performing the discovery and grouping (and other) operations as described herein. In various embodiments, collection engine 42 may collect configuration information (including address resolution protocol (ARP) tables, established connections and listening port information) of switches 48, servers 14, VMs 29 and other such network element(s) 18 in network 12. Grouping analysis module 44 may analyze communication patterns amongst endpoints 28 and classify (e.g., group) endpoints 28 that are sending or receiving traffic, based on certain criteria. Reporting module 46 arranges the grouping results in a user presentable form.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In a data center environment, business services rely upon many instances of a variety of application types. In some scenarios, it may be desirable to distinguish such instances and classify them into distinct groups based on the services offered by the applications. Moreover, it may be desirable to closely track performance, capacity, faults and other parameters associated with each of their application instances, as also the inter-dependencies between applications, for example, to ensure that service level agreements (SLAs) between customers and the data center are being met for the business services. Over time, the data center environment may host a complex set of heterogeneous applications, whose type, number of instances and inter-dependencies can be lost in operational processes, potentially leading to lack of visibility and introducing inefficiencies in the application and data center life-cycle.

Groupings of applications are currently based on virtual LAN (VLAN) and subnets and are tailored towards network management. For example, connectivity and policies may be applied based on the VLAN groupings—one or more applications are grouped into VLANs and IP subnets are mapped to those VLANs; connectivity through routing is configured and network services are applied to the subnet addressing. Such a grouping mechanism can restrict the types of groups into which applications can be grouped and the policies that can be applied to the applications. The grouping mechanism also lends itself to misconfiguration and undesirable loose policy configuration. Manual configurations, process, and coupled constructs from the grouping mechanism can lead to slower deployment, higher configuration error rates, and reduced auditability, potentially creating significant business impact.

Cisco® Application Centric Infrastructure™ (ACI) in the data center is a holistic architecture with centralized automation and policy-driven application profiles that can permit more flexible grouping. ACI delivers software flexibility with scalable hardware performance. ACI includes various switches configured (or configurable) for ACI, a centralized policy management and application policy infrastructure controller (APIC), an application virtual switch (AVS) for virtual network edges, software and hardware components, integrated physical and virtual infrastructure, and an open ecosystem of network, storage, management, and orchestration vendors. ACI can facilitate a network that is deployed, monitored, and managed in a fashion that supports development operations (DevOps) and rapid application change, with reduced complexity and a common policy framework that can automate provisioning and managing of resources.

Within the APIC, software applications are defined logically using constructs that are application centric, rather than network centric. For example, a group of physical and virtual web servers may be grouped in a single tier of a three-tier application. The communication between the tiers and the policies that define that communication comprise the complete application. Within the APIC, the complete application definition is comprised in the application profile, which is specified based on the communication, security, and performance needs of the application. APIC used the application profile to push the logical topology and policy definitions down to stateless network hardware in the network fabric. Such an approach is reverse of traditional architectures, in which VLANs, subnets, fire-wall rules, etc. dictate where and how an application can run.

The application profile can comprise a collection of EPGs, their connections, and the policies that define those connections. Application profiles are used to define connectivity of application tiers such as web-app-database, compute, -network -storage. They can be represented as connectivity graphs. Application profiles may comprise instantiation of a complete application on the network. In the ACI implementation, the Application profiles are used by network engineers, application owners, and developers to map an application onto the network hardware. In other words, Application profiles are the logical representation of an application and its interdependencies in the network fabric. Application profiles are designed to be modeled in a logical way that matches the way that applications are designed and deployed. The configuration and enforcement of policies and connectivity is handled by the ACI system (e.g., software) rather than manually by an administrator.

In addition, ACI permits EPGs to be created manually. Rather than using forwarding constructs such as addressing or VLANs to apply connectivity and policy, EPGs use a grouping of application endpoints. For example, an EPG could be the group of components that make up an application's web tier. EPGs are also used to represent entities such as outside networks, network services, security devices, and network storage. Within an EPG separate endpoints can exist in one or more subnets, and subnets can be applied to one or more EPGs based on several other design considerations. Layer 2 forwarding behavior can also be applied independently of the Layer 3 addressing.

EPGs are designed for flexibility, allowing their use to be tailored to one or more deployment models that the customer can choose. The EPGs are used to define the elements to which policy is applied. Within the network fabric, policy is applied between EPGs (e.g., configuring the mode in which EPGs communicate with one another), rather than being based on addressing and forwarding constructs. The EPG model offers a number of management advantages. For example, it offers a single object with uniform policy to higher-level automation and orchestration tools. Tools need not operate on individual endpoints to modify policies. Additionally, it helps ensure consistency across endpoints in the same group regardless of their placement in the network.

Several methods exist for defining endpoints and placing them in EPGs. The use of EPGs can differ across customer environments and even across a single fabric deployment. The combination of EPGs and Application profiles allows for stateless network policy definition and enforcement free from dependencies on locality and forwarding. Application policy is defined in the user space and automatically mapped onto the network hardware when applied based on workload location.

However, generating groupings are currently based on manual or semi-manual methods and require prior knowledge of application instances and types of applications deployed in the network. Many products in the market providing application discovery, analysis and migration solutions suffer from the same drawback, and require user specification of applications and/or application components to work effectively.

Note that although a number of discovery and collection tools are available in the network market, there are no solutions that perform an automated network traffic-based grouping using the collected information. Moreover, none of the available discovery and collection tools apparently calculate affinity based on communication targets for network data and compute data.

Communication system 10 is configured to address these issues (among others) to offer a system and method for automatically discovering and grouping application endpoints 28 in a network environment. According to various embodiments, entity discovery and grouping module 16 may discover endpoints 28 communicating in network 12, calculate affinity between the discovered endpoints 28, and group endpoints 28 into separate EPGs 30 according to the calculated affinity, each EPG 30 representing a logical grouping of similar endpoints that can be used to apply common forwarding and policy logic according to logical application boundaries.

Embodiments of communication system 10 can facilitate identification and correlation of data points and conditions to distinguish the type and variety of applications 20 in network 12, which can include a heterogeneous data center environment. Entity discovery and grouping module 16 may identify and collect specific data points across endpoints 28 and network devices that provide network services to endpoints 28. Entity discovery and grouping module 16 may correlate the collected data-points to check for conditions that can distinguish and group endpoints 28 based on instances of applications 20.

In some embodiments, collection engine 42 may execute on customer premises. In other embodiments, collection engine 42 may execute in another part of network 12. Collection engine 42 may provide the ability to securely capture device configuration information securely through multiple protocols such as Simple Network Management Protocol (SNMP), Secure Shell (SSH), and Windows Management Instrumentation (WMI). Collection engine 42 may collect configuration settings and other related information, including ARP tables and other communication protocol state tables, of various network element(s) 18 (e.g., servers 14, VMs 29, switches 48, etc.) in network 12. Collection engine 42 may also collect process, established connections, and listening port information from each of endpoints 28 that are to be classified.

The collection process may be repeated for substantially all endpoints 28 in a selected set of VLANs. In addition to collecting configuration information, collection engine 42 may also collect live network flow information from aggregation switches (e.g., 48) in the data center, yielding communication patterns between endpoints 28. In various embodiments, collection engine 42 may automate discovery of and collection of various network parameters (including compute infrastructure) from network 12, allowing the process to scale to handle larger customer deployments consisting of potentially thousands of endpoints 28.

Grouping analysis module 44 may analyze communication patterns amongst endpoints 28 within a selected set of VLANs and classify or group endpoints 28 that are sending or receiving network traffic, based on certain criteria. In various embodiments, grouping analysis module 44 may build (e.g., generate, calculate, determine, etc.) affinity between pairs of endpoints 28 based on a weighted average of multiple factors such as percentage of common flows between endpoints 28 and their peers and percentage of common application instances executing on endpoints 28. Grouping analysis module 44 may group endpoints 28 based on the affinity using an appropriate algorithm, as discussed further herein. In some embodiments, grouping analysis module 44 may sort endpoints 28 in an order (e.g., descending order; ascending order), for example, based on the number of traffic flows they have with their peers. Top talkers within a certain window of time may be selected as seeds and other endpoints 28 within the selected VLANs may be grouped with the seeds based on their affinity values.

In various embodiments, reporting module 46 arranges the grouping results in a user presentable form. The user can view the membership of each EPG 30 of endpoints 28 along with the services being offered and consumed at the group level and can edit the results as necessary. Reporting module 46 may also allow the user to export the results in a form that can be used to configure a software defined networking (SDN) controller (e.g., an SDN controller is a strategic control point in the network, relaying information to the switches/routers 'below' (via southbound APIs) and the applications and business logic 'above' (via northbound APIs); some of the basic tasks of the SDN controller include inventorying what devices are within the network and the capabilities of each, gathering network statistics, etc.)

In a general sense, embodiments of communication system 10 may use one or more algorithms to identify similarities between endpoints 28, including their communication patterns, calculate affinities, and create EPGs 30 with endpoints 28 having similar functionalities (e.g., in terms of application components). In an example embodiment, for every endpoint 28 in a VLAN subnet, information from network traffic that it receives or generates may be gathered. Based on the gathered information (but excluding well-known and widespread services such as DNS), endpoints 28 may be grouped into EPGs 30. In some embodiments, the grouping may be based on user specified criterion, for example, as a percentage of communication attributes (e.g., traffic attributes, process attributes, socket attributes, etc.). Configurations of switches 48 in network 12 may be analyzed in view of the groupings to generate (or facilitate, as the case may be) access control lists (ACLs) between the groups. Such mechanisms may be extended to other network element(s) 18 such as firewall, load-balancer etc. In some embodiments, aggregate bandwidth specifications may be based on the discovered traffic patterns and groupings. In various embodiments, a user amenable graphical user interface (GUI) to input data, control grouping criteria, etc. may be provided.

According to various embodiments of communication system 10, endpoints 28 that are active in network 12 may be identified, and their relationship (e.g., association, connection, affiliation, etc.) to particular application components may be discovered, thereby defining their membership in a particular EPG 30. It may be assumed that each application 20 is associated to a process running on at least one of endpoints 28. Processes on the endpoint open TCP/UDP ports to services or to consume requests from other endpoints through network 12. For example, server processes open listening ports through OS socket interface for serving requests; client processes open dynamic ports to consume services from other processes. Network conversations indicate endpoints 28 and corresponding ports in communication with each other.

In various embodiments, entity discovery and grouping module 16 may aggregate and categorize multiple conversations and flows in network 12 over a predetermined duration. Collection engine 42 may discover endpoint communications and grouping analysis module 44 may create a peer relationship matrix. The peer relationship matrix may include substantially every endpoint 28 being analyzed, and indicate the type of peer relationship, such as server or client (e.g., associated server endpoints to which the analyzed endpoint is a client of, associated client endpoints to which the analyzed endpoint is a server for). The peer relationship matrix may also indicate packet and/or byte counts transferred over network 12 for each kind of traffic associated with the endpoint being analyzed.

Collection engine 42 may discover processes running on each one of endpoints 28 and create a process matrix. The process matrix can include every endpoint being analyzed and associated processes currently running on each endpoint, associated port numbers being used by the processes to serve requests, associated processes acting as client to a particular server, and other attributes such as user identifier (UID), group identifier (GID) being used to execute the process. Entity discovery and grouping module 16 may use adaptive intelligence to filter out noises that might influence creation of peer relationship matrix and process matrix. Examples of traffic related noise can include non-server traffic (e.g., user traffic), network policy server (NPS) traffic, network time protocol (NTP) traffic, DNS traffic or security vulnerability on the endpoint etc. Examples of process related noise can include virus scan software, various VMWare® tools processes, network management software, etc. In some embodiments, the peer relationship matrix and process matrix may be consolidated into a single endpoint matrix.

Entity discovery and grouping module 16 may calculate the affinity between endpoint 28, for example, based on a weighted average of network affinity, compute affinity, and user specified affinity. Network affinity includes a percentage of server peers and traffic attributes (e.g., octets/packets) that are common between each pair of endpoints 28 in the peer relationship matrix, and a percentage of client peers and traffic attributes that are common between each pair of endpoints 28 in the peer relationship matrix.

Consider that an endpoint, acting as a client, establishes a secure communication session with another endpoint, acting as a server. The server endpoint may store security credentials associated with the client endpoint. Because only the server endpoint would be able to decrypt the client endpoint's messages based on the stored security credentials, the client should contact the particular server endpoint (and not other server endpoints) for subsequent requests, at least while the security arrangement is still valid. That a client should direct subsequent requests to the same server, as described above, is the notion of affinity between the client endpoint and server endpoint. When affinity has been established between the client and server, the server is known as the client's elected server. Establishing affinity may require storing affinity information so that the client can determine which server to contact for its subsequent requests. The affinity information can include any information relating to the affinity relationship, such as the identity of the elected server, and can be stored in many locations, such as in a file system or an HTTP cookie. Furthermore, two client endpoints talking to the same server endpoint may indicate a network affinity between the two client endpoints.

In various embodiments, endpoints 28 may have network-client affinity (e.g., selecting the endpoint as a client) towards certain endpoints, and network-server affinity (e.g., selecting the endpoint as a server) towards certain other endpoints. In an example embodiment, network affinity between two endpoints i and j is computed as follows: network-affinity[i,j]=wni*network-server-affinity[i,j]+wn2*network-client-affinity[i,j], where wni and wag are the weights associated with server and client network affinity values, respectively.

Compute affinity includes a percentage of process and socket attributes (e.g., listening port) that are common between each pair of endpoints 28 in the process matrix. User specified affinity includes a percentage of common attributes between endpoints 28 across network configuration, DNS naming, virtualization attributes, etc. In an example embodiment, affinity between endpoints i and j is computed as follows: affinity [i,j]=wi*network–affinity[i,j]+w2*compute-affinity[i,j]+w3*user-specified-affinity[i,j], where wi, w2, and w3 are the relative weights associated with network, compute and user-specified affinities, respectively.

Based on the affinity calculations, any two endpoints in the peer relationship matrix belong to the same application component if their affinity factor is above the median of its affinity with all other endpoints, and can therefore be placed in the same endpoint group. In an example, assuming the mean to be an affinity threshold value, the following steps may be executed to group endpoints 28: sort endpoints 28 in the peer relationship matrix in an order (e.g., descending order; ascending order) of total number of peers (e.g., server peers and client peers); pick the first endpoint in the matrix as a seed; compare other endpoints in the matrix with the selected seed based on affinity of the other endpoints with the seed. The other endpoints that exceed a pre-selected affinity threshold can be grouped with the seed into a common EPG. Other factors that can influence grouping, such as duplicate Media Access Control (MAC) addresses can also be considered. After all endpoints in the matrix are compared with the seed, all grouped endpoints may be removed from the matrix and the process repeated by picking the first endpoint in the revised matrix as the next seed and comparing it with the remaining ungrouped endpoints, and so on until no endpoints remain to be grouped in the matrix. The grouping results may be subsequently displayed to a user in any suitable manner.

The methodology and apparatus to discover various instances of applications 20 and corresponding application components can be used for a variety of purposes, including for ACI migration. In some embodiments, Cisco's ACI framework may be implemented to provide a variety of benefits in network 12, for example, better application visibility, agility and performance. Because migrating to the ACI infrastructure from a legacy data center architecture (comprising non-ACI infrastructure) can pose a non-trivial challenge. The various operations described herein can automate discovery of application profiles to enable migration from non-ACI infrastructure to ACI enabled infrastructure.

Turning to the infrastructure of communication system 10, the network topology can include any number of computing devices, smartphones, servers, hardware accelerators virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, network 12 may comprise an ACI fabric including an Application Policy Infrastructure Controller (APIC), spine switches, and leaf switches that together handle the application of network policy and the delivery of packets. In some embodiments, the fabric may be configured in a leaf-and-spine architecture, with links connecting each leaf to each spine, enabling linear scalability and robust multi-pathing within the fabric, optimized for east-to-west traffic suitable for applications.

The controller including APIC may comprises a clustered network control system, may provide programmability and simplified management. In a general sense, the APIC exposes a northbound API through Extensible Markup Language (XML) and JavaScript Object Notation (JSON) and provides a command-line interface (CLI) and graphical user interface (GUI) that use the API to manage the fabric. The system also provides an open source southbound API, which allows third-party network service vendors to implement policy control for devices through the controller. The APIC is responsible for tasks from fabric activation and switch firmware management to network policy configuration and instantiation.

While the controller can act as the centralized policy and network management engine for the fabric, it may be completely removed from the data path, including the forwarding topology in some embodiments. In such embodiments, the fabric can still forward traffic even when communication with the controller is lost. The controller may be implemented in a separate network appliance, and it can be executed as three or more appliances for performance and availability. In some embodiments, the controller may be modeled on distributed computing to provide scalability and reliability.

In various embodiments, entity discovery and grouping module 16 may comprise a portion of APIC executing in network 12. In other embodiments, entity discovery and grouping module 16 may execute in a separate network element 18 (e.g., server, network appliance) that can interface with the controller and APIC to provide grouping results as appropriate. In some embodiments, substantially all portions of entity discovery and grouping module 16 may execute in a single network element 18; in other embodiments, entity discovery and grouping module 16 may execute in a distributed manner, in a plurality of network element(s) 18 throughout network 12.

In some embodiments, each of application components (e.g., web tier components 22, application tier components 24 and database tier components 26) may represent separate endpoints 28 in network 12. Virtually any suitable network and computing architecture may be used to host and execute application components within the broad scope of the embodiments. Note that forwarding elements 32(1)-32(3) may comprise switches, routers and other network element(s) 18 capable of forwarding packets in a network environment.

In various embodiments, servers 14 may comprise physical servers with single operating system, hosting one or more virtual machines 29. In other embodiments, servers 14 may comprise virtual servers capable of hosting multiple virtual machines 29, each VM having its own unique operating system. In various embodiments, servers 14 may comprise physical or virtual computing devices capable of multiplexing different application software on a single processing platform.

Figure 2:
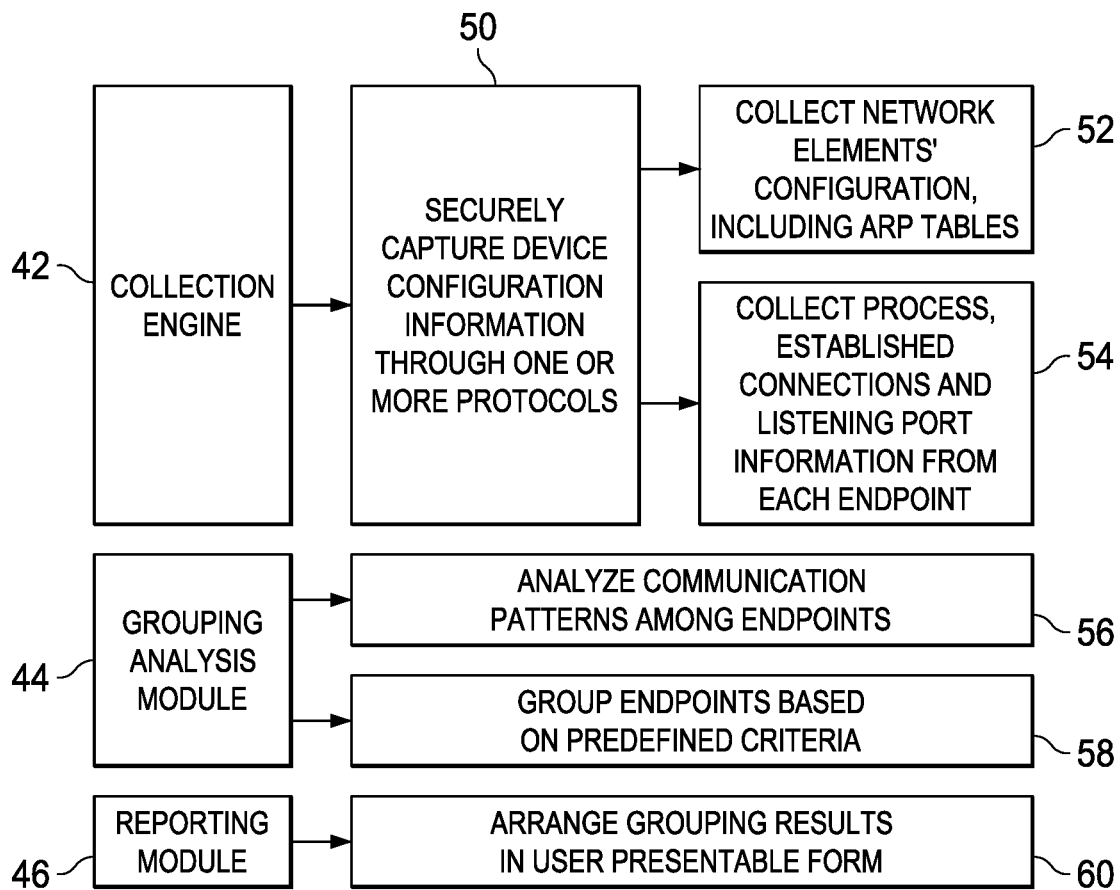
FIG. 2 is a simplified block diagram illustrating example details of embodiments of the communication system.

Turning to FIG. 2, FIG. 2 is a simplified block diagram illustrating example details of an embodiment of communication system 10. Collection engine 42 may at 50, securely capture device configuration information from endpoints 28 through one or more suitable protocols. Such capturing may include at 52 collecting configuration settings and related information, including ARP tables and other communication protocol state tables, of various network element(s) 18 (e.g., servers 14, VMs 29, switches 48, etc.) in network 12. The capturing may also include at 54 collecting process, established connections and listening port information from each endpoint 28.

Grouping analysis module 44 may at 56 analyze communication patterns among endpoints 28 based on the captured information. Grouping analysis module 44 may at 58 group endpoints 28 based on predefined criteria. In various embodiments, the predefined criteria may be programmed into grouping analysis module 44; in other embodiments, the predefined criteria may be generated from user specified criteria in addition to default criteria, if any. Users may specify the criteria through suitable CLIs or GUIs, as appropriate. Reporting module 46 may, at 60, arrange grouping results in a user presentable form (e.g., amenable to be displayed on a computer screen, or printed out).

Figure 3:
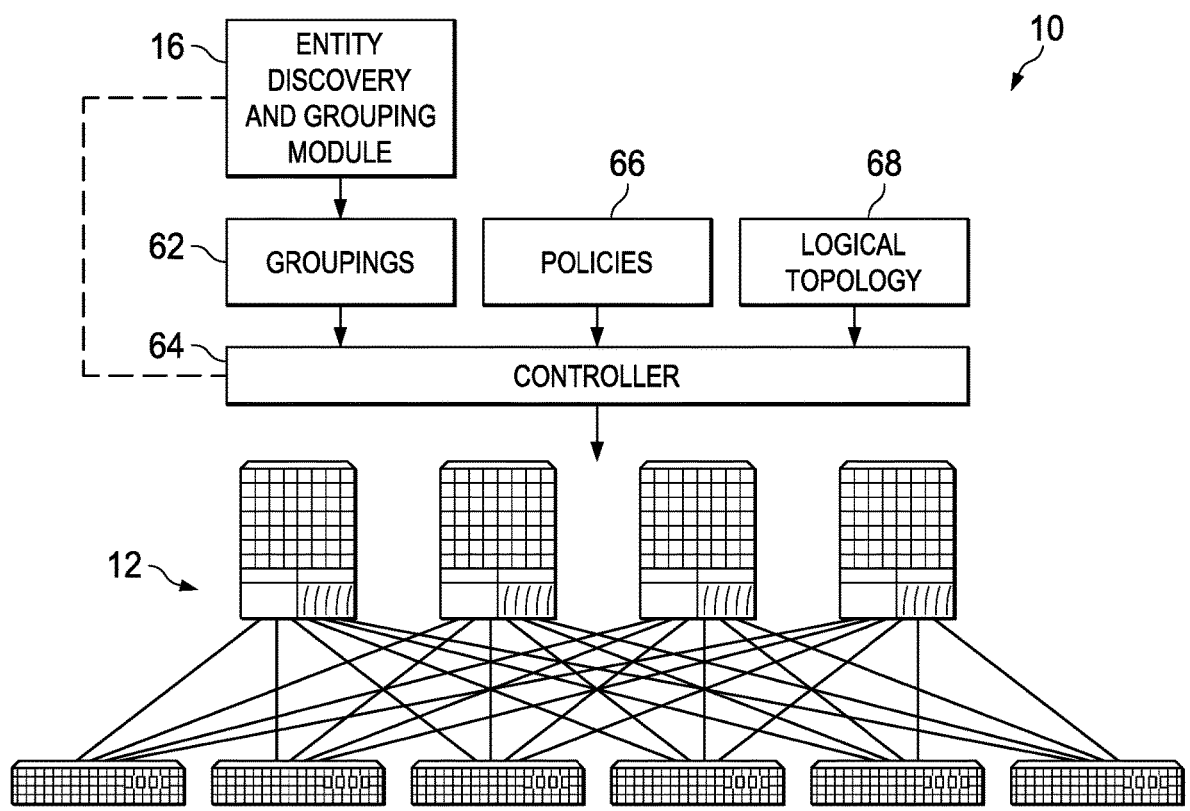
FIG. 3 is a simplified block diagram illustrating other example details of embodiments of the communication system.

Turning to FIG. 3, FIG. 3 is a simplified block diagram illustrating example details of an embodiment of communication system 10. Entity discovery and grouping module 16 may generate groupings 62 comprising one or more EPGs 30. Grouping 62 may be fed to a controller 64. In some embodiments, entity discovery and grouping module 16 may be implemented in controller 64. In other embodiments, entity discovery and grouping module 16 may be implemented in network element 18 external to controller 64 and coupled thereto over the network. Controller 64 may additionally take as inputs policies 66 and logical topology 68 to instantiate application profiles in network 12.

Figure 4:
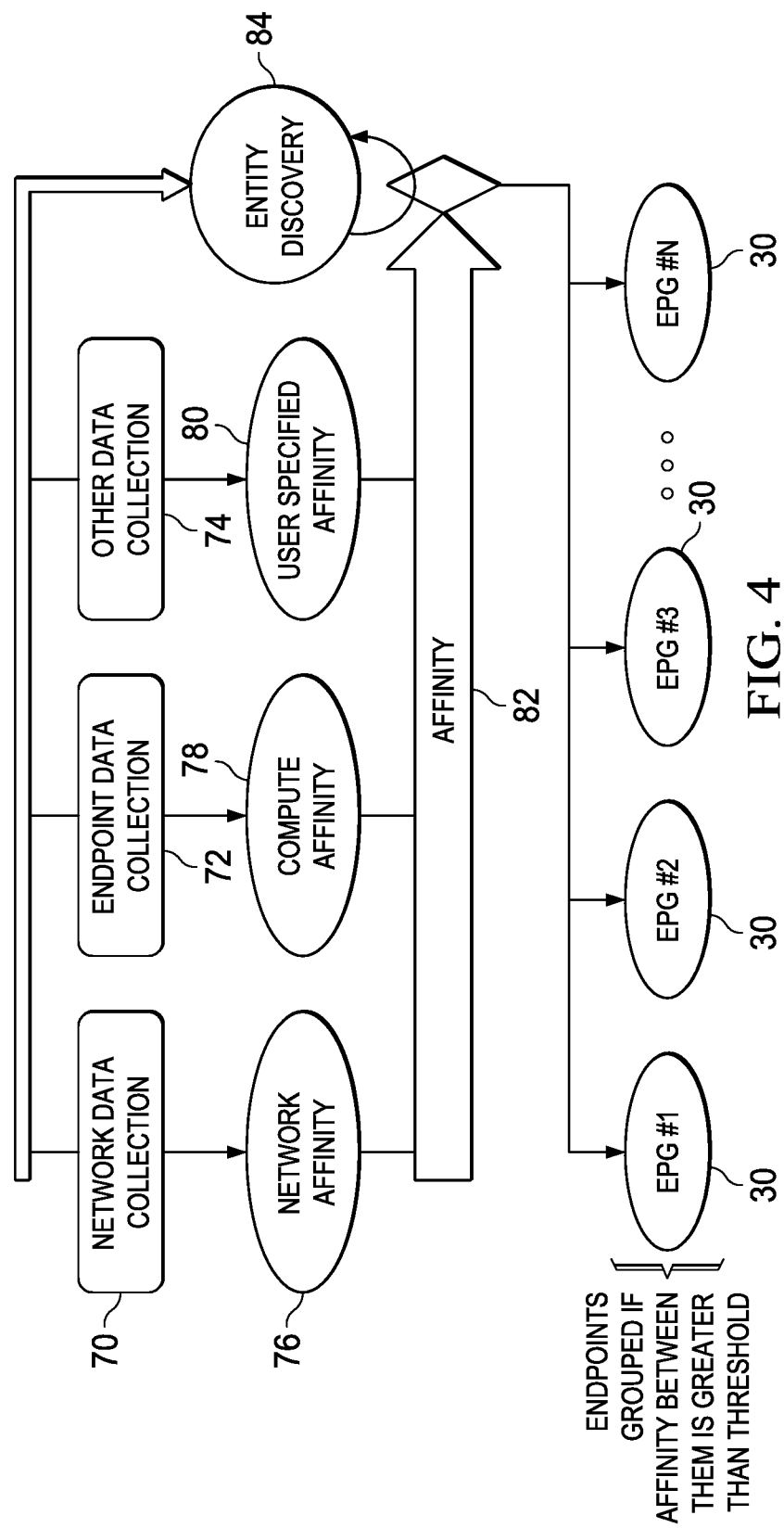
FIG. 4 is a simplified block diagram illustrating yet other example details of embodiments of the communication system.

Turning to FIG. 4, FIG. 4 is a simplified block diagram illustrating example details of an embodiment of communication system 10. Entity discovery and grouping module 16 may perform network data collection 70, endpoint data collection 72, and other data collection 74 (e.g., data otherwise not included in network data collection 70 and endpoint data collection 72). Entity discovery and grouping module 16 may calculate network affinity 76 based on network data collected in network data collection 70; calculate compute affinity 78 based on data collected in endpoint data collection 72; and calculate user specified affinity 80 based on data collected in other data collection 74. Entity discovery and grouping module 16 may compute the affinity between pairs of endpoints 28 discovered by entity discovery operations 84 and based on calculated network affinity 76, compute affinity 78 and user specified affinity 80. Endpoints 28 may be grouped into EPGs 30 (e.g., EPG #1, EPG #2, etc.) based on affinity 82 between pairs of endpoints (e.g., if affinity 82 between two endpoints is greater than a predetermined threshold, the endpoints may be grouped into the same EPG).

Figure 5:
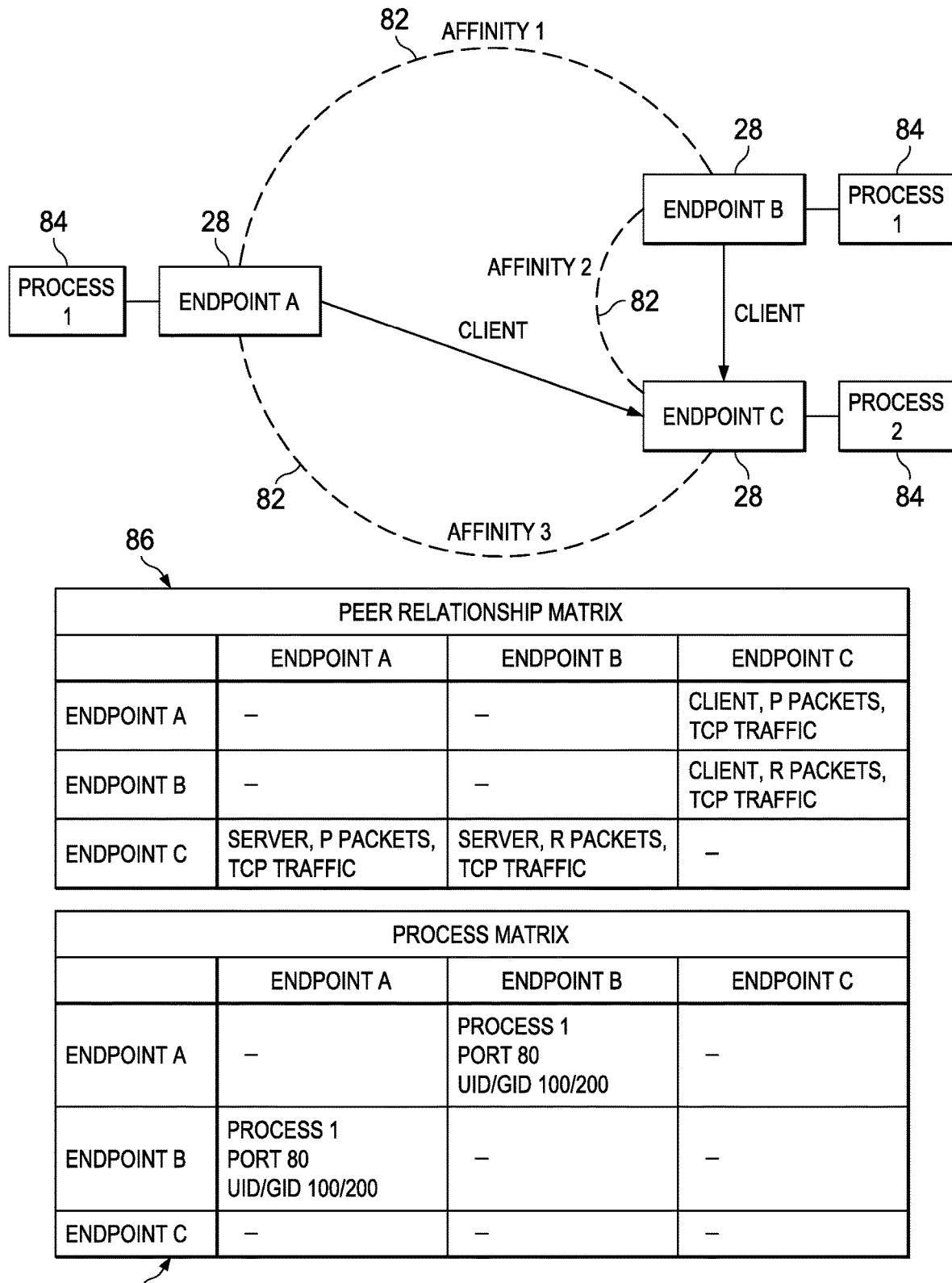
FIG. 5 is a simplified block diagram illustrating yet other example details of embodiments of the communication system.

Turning to FIG. 5, FIG. 5 is a simplified block diagram illustrating example details of an embodiment of communication system 10. Assume, merely as examples, and not as limitations, that endpoints 28, namely endpoint A, endpoint B and endpoint C communicate in network 12. Endpoints A and B act as a client to endpoint C. Assume also, that various processes 84 are used by different endpoints 28. For example, process 1 is used by endpoints A and B; process 2 is used by endpoint C. For example, endpoints A and B may represent a web tier component of an application; endpoint C may represent an application tier component of the same application; however such information is not known apriori to entity discovery and grouping module 16.

Entity discovery and grouping module 16 may discover the various network relationships and process characteristics in network 12 and generate a peer relationship matrix 86 and a process matrix 88. Peer relationship matrix 86 may lay out the network attributes, such as network relationship (server, client, etc.) and traffic (e.g., type, quantity, etc.) between pairs of endpoints 28. In an example embodiment, each endpoint 28 may be listed in rows and columns separately, and the relationship and traffic between pairs of endpoints 28 may be captured in each cell. For example, the cell common to the row for endpoint A and column for endpoint B may indicate that endpoint A has no network traffic with endpoint B; the cell common to the row for endpoint A and column for endpoint C may indicate that endpoint A is a client to endpoint C, and the traffic includes P packets of TCP traffic; and so on. Thus, any non-empty cell may indicate a network affinity between the corresponding endpoints. Moreover, any commonly populated column (e.g., column indicating endpoint C is populated for two rows indicating endpoints A and B) may suggest a network affinity between the corresponding rows (e.g., between endpoints A and B). Note that various other formats may also be used to capture the network attributes of pairs of endpoints in peer relationship matrix 86.

Process matrix 88 may lay out the process attributes that are common between pairs of endpoints 28. For example, the cell common to the row for endpoint A and column for endpoint B may indicate that both endpoints A and B run process 1 on port 80; and so on. Thus, any non-empty cell may indicate a compute affinity between the corresponding endpoints. Note that various other formats may also be used to capture the process attributes of pairs of endpoints in process matrix 88. Note also that various other process attributes may be included in process matrix 88 within the broad scope of the embodiments.

Entity grouping and discovery module 16 may compute affinity 82 between pairs of endpoints 28. For example, affinity 1 may be computed between endpoints A and B; affinity 2 may be computed between endpoints B and C; and affinity 3 may be computed between endpoints A and C. Based on the computed affinities 82, and user specified grouping criteria (e.g., group according to application components), entity discovery and grouping module 16 may group endpoints A and B into a common EPG associated with the web tier component of the particular application; endpoint C may be grouped into a separate EPG associated with the application tier component of the particular application; and so on.

Figure 6:
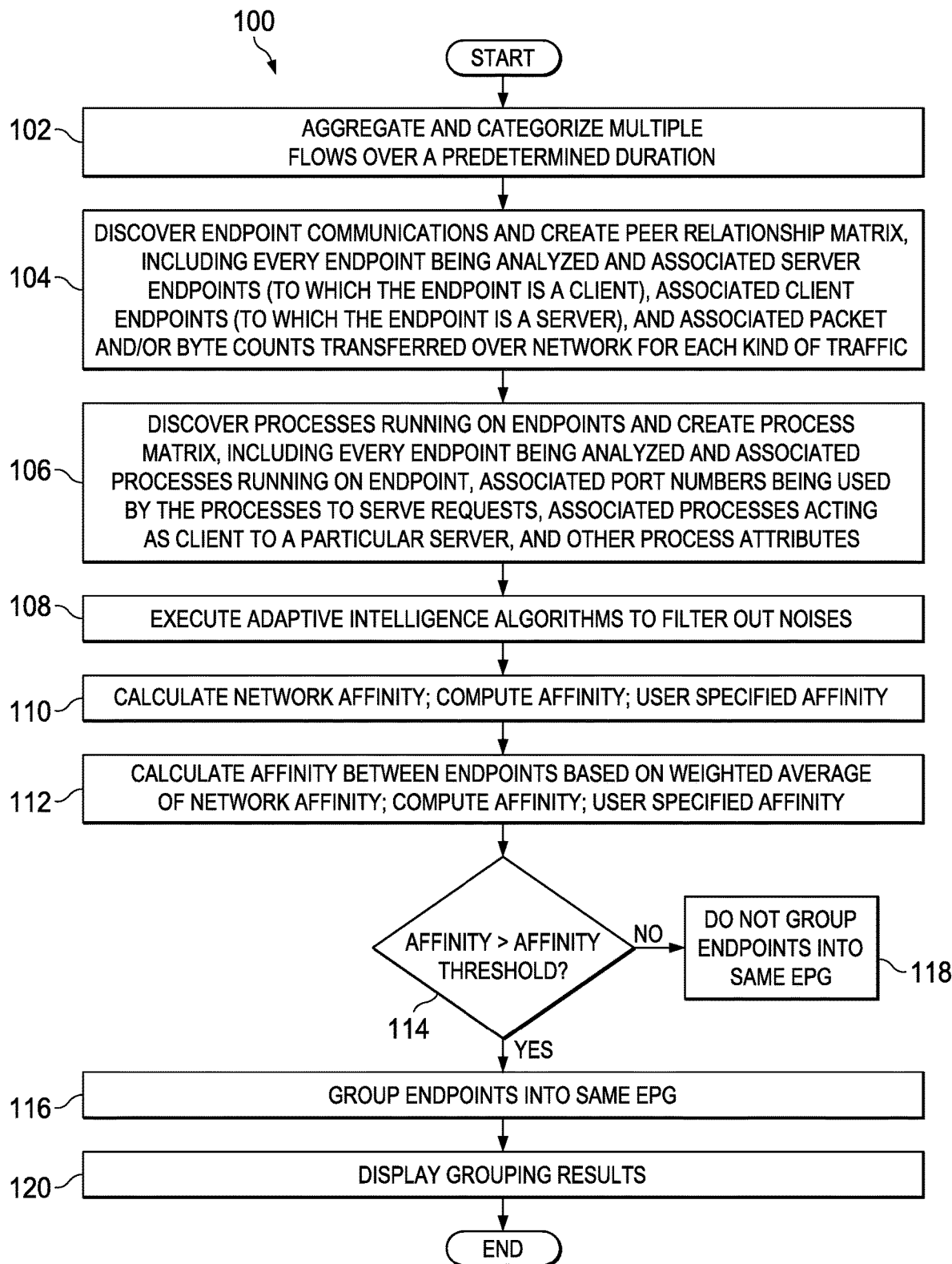
FIG. 6 is a simplified flow diagram illustrating example operations that may be associated with an embodiment of the communication system.

Turning to FIG. 6, FIG. 6 is a simplified flow diagram illustrating example operations 100 that may be associated with embodiments of communication system 10. At 102, entity discovery and grouping module 16 may aggregate and categorize multiple network flows over a predetermined time duration. At 104, entity discovery and grouping module 16 may discover endpoint communication and create peer relationship matrix 86, including substantially every endpoint 28 being analyzed, associated server endpoints (to which the endpoint being analyzed is a client), associated client endpoints (to which the endpoint being analyzed is a server), and associated packet and/or byte counts transferred over the network for each kind of traffic.

At 106, entity discovery and grouping module 16 may discover processes running on endpoints 28 and create process matrix 88, including substantially every endpoint being analyzed and associated processes running on endpoint, associated port numbers being used by the processes to serve requests, associated processes acting as client to a particular server, and other process attributes. At 108, adaptive intelligence algorithms may be used to filter out noises. At 110, network affinity 76, compute affinity 78 and user specified affinity 80 may be calculated. At 112, affinity 82 between pairs of endpoints 28 may be calculated based on weighted average of network affinity 76, compute affinity 78 and user specified affinity 80. At 114, a determination may be made whether affinity 82 is greater than a pre-specified affinity threshold. If affinity 82 is greater than a pre-specified affinity threshold, the pairs of endpoints 28 may be grouped into the same EPG 30 at 116; otherwise, at 118, they may not be grouped into the same EPG 30. At 120, the grouping results may be displayed suitably to the user.

Figure 7:
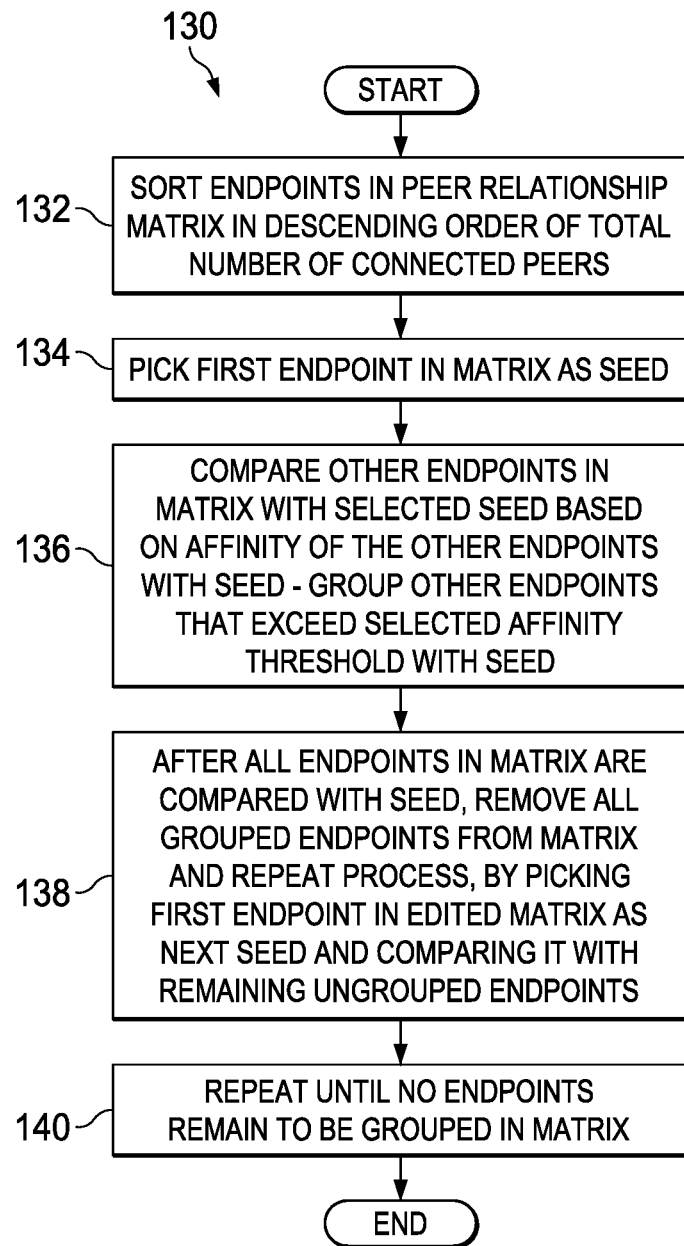
FIG. 7 is a simplified flow diagram illustrating other example operations that may be associated with an embodiment of the communication system.

Turning to FIG. 7, FIG. 7 is a simplified flow diagram illustrating example operations 130 that may be associated with embodiments of communication system 10. At 132, endpoints 28 may be sorted in peer relationship matrix 86 in an order (e.g., descending order; ascending order) of total number of connected peers. At 134, a first endpoint (e.g., having maximum number of connected peers) may be selected as a seed. At 136, other endpoints in peer relationship matrix 86 may be compared with the selected seed based on affinity of the other endpoints with the selected seed. Endpoints that have affinity greater than the affinity threshold may be grouped into the same EPG as the selected seed. At 138, after all endpoints 28 in peer relationship matrix 86 are compared with the selected seed, the grouped endpoints may be removed from peer relationship matrix 86, and the process repeated for the remaining endpoints (e.g., selecting the endpoint having the maximum number of connected peers in the edited peer relationship matrix 86 as the next seed, comparing it with other endpoints, etc.) At 140, the process is repeated until no endpoints remain to be grouped in peer relationship matrix 86.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, network element 18 executing entity discovery and grouping module 16. In some embodiments, one or more of these features may be implemented in hardware, provided external to these elements, or consolidated in any appropriate manner to achieve the intended functionality. The various components (e.g., network element(s) 18, endpoints 28, etc.) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, entity discovery and grouping module 16 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 38) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 40) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. A method comprising:
    selecting a first endpoint in a peer relationship matrix;
    comparing the first endpoint with other endpoints in the peer relationship matrix;
    grouping at least one endpoint of the other endpoints in an endpoint group with the first endpoint, when the comparison between the at least one endpoint and the first endpoint exceeds a threshold; and
    in response to grouping the at least one endpoint into the endpoint group, removing the at least one endpoint from the peer relationship matrix.

2. The method of claim 1, further comprising:
    sorting of the first endpoint and the other endpoints in an order in the peer relationship matrix.

3. The method of claim 2, wherein the order is based on a number of connected peers with each of the endpoints.

4. The method of claim 1, wherein the first endpoint is selected based on having a maximum number of connected peers.

5. The method of claim 1, further comprising:
    selecting a second endpoint in the peer relationship matrix;
    comparing, the other endpoints in the peer relationship matrix with the second endpoint; and
    grouping at least one additional endpoint of the other endpoints in a second endpoint group with the second endpoint, when the comparison between the at least one additional endpoint and the second endpoint exceeds the threshold; and
    in response to grouping the at least one additional endpoint into the second endpoint group, removing the at least one additional endpoint from the peer relationship matrix.

6. The method of claim 1, wherein the comparison is based on an affinity between the first endpoint and the other endpoints and the grouping based on the affinity exceeding the threshold.

7. The method of claim 6, wherein, the affinity comprises a percentage of server peers and client peers and associated traffic attributes common between the f endpoints.

8. The method of claim 6, wherein, the affinity comprises a percentage of process and socket attributes common between the endpoints.

9. The method of claim 6, wherein, the affinity comprises a percentage of common user specified attributes between the endpoints.

10. A system comprising:
at least one processor; and
at least one memory storing instructions, which when executed by the at least one processor, causes the at least one processor to:
- select a first endpoint in a peer relationship matrix;
- compare the first endpoint with other endpoints in the peer relationship matrix;
- group at least one endpoint of the other endpoints in an endpoint group with the first endpoint, when the comparison between the at least one endpoint and the first endpoint exceeds a threshold; and
- in response to grouping the at least one endpoint into the endpoint group, remove the at least one endpoint from the peer relationship matrix.

11. The system of claim 10, further comprising instructions which when executed by the at least one processor, causes the at least one processor to:
- sort of the first endpoint and the other endpoints in an order in the peer relationship matrix.

12. The system of claim 11, wherein the order is based on a number of connected peers with each of the endpoints.

13. The system of claim 10, wherein the first endpoint is selected based on having a maximum number of connected peers.

14. The system of claim 10, wherein the comparison is based on an affinity between the first endpoint and the other endpoints and the grouping based on the affinity exceeding the threshold.

15. The system of claim 14, wherein the affinity comprises a percentage of server peers and client peers and associated traffic attributes common between the endpoints.

16. The system of claim 14, wherein the affinity comprises a percentage of process and socket attributes common between the endpoints.

17. The system of claim 14, wherein the affinity comprises a percentage of common user specified attributes between the endpoints.

18. At least one non-transitory computer readable medium storing instructions, which when executed by at least one processor, causes the at least one processor to:
- select a first endpoint in a peer relationship matrix;
- compare the first endpoint with other endpoints in the peer relationship matrix;
- group at least one endpoint of the other endpoints in an endpoint group with the first endpoint, when the comparison between the at least one endpoint and the first endpoint exceeds a threshold; and
- in response to grouping the at least one endpoint into the endpoint group, remove the at least one endpoint from the peer relationship matrix.

19. The at least one non-transitory computer readable medium of claim 18, wherein the first endpoint is selected based on having a maximum number of connected peers.

20. The at least one non-transitory computer readable medium of claim 18, wherein the comparison is based on an affinity between the first endpoint and the other endpoints and the grouping based on the affinity exceeding the threshold.

* * * * *